US005661450A

United States Patent [19]
Davidson

[11] Patent Number: 5,661,450
[45] Date of Patent: Aug. 26, 1997

[54] LOW INDUCTANCE TERMINATION RESISTOR ARRAYS

[75] Inventor: Howard L. Davidson, San Carlos, Calif.

[73] Assignee: Sun Microsystems, Inc.

[21] Appl. No.: 560,206

[22] Filed: Nov. 21, 1995

[51] Int. Cl.$^6$ .................................................. H01L 1/01
[52] U.S. Cl. .......................... 338/320; 338/309; 338/312; 338/61; 333/81 R; 29/620
[58] Field of Search ...................... 338/48–49, 51, 338/60–61, 203, 216, 221, 295, 307, 309, 312, 325, 330–333, 235, 239, 260, 320, 29, 620; 333/81 R, 1, 4–5, 130

[56] References Cited

U.S. PATENT DOCUMENTS

| Re. 29,018 | 10/1976 | Garuts | 333/81 A |
|---|---|---|---|
| 3,091,743 | 5/1963 | Wilkinson | 333/130 |
| 3,447,120 | 5/1969 | Rask et al. | 333/1 |
| 3,521,201 | 7/1970 | Veteran | 333/81 R |
| 3,701,056 | 10/1972 | Ozawa et al. | 333/180 |
| 3,806,841 | 4/1974 | Brunner | 333/81 R |
| 4,062,609 | 12/1977 | Malcolm | 333/81 R |
| 4,146,853 | 3/1979 | Kiyono et al. | 333/81 R |
| 4,725,925 | 2/1988 | Tanaka et al. | 361/774 |
| 4,788,523 | 11/1988 | Robbins | 338/309 |
| 5,347,258 | 9/1994 | Howard et al. | 338/333 |

FOREIGN PATENT DOCUMENTS

| 2655841A1 | 6/1978 | Germany | 338/221 |
|---|---|---|---|

Primary Examiner—Teresa J. Walberg
Assistant Examiner—Karl Easthom
Attorney, Agent, or Firm—Flehr Hohbach Test Albritton and Herbert, LLP

[57] ABSTRACT

An array of termination resistors has symmetrical geometry producing essentially no net magnetic field and a resultant low inductance is fabricated on a substrate as disk resistors. Conductive through vias are formed in the substrate in an array pattern defining what will be resistor first and second contacts. Each disk resistor has one first contact located at the resistor disk center, and preferably four second contacts located symmetrically about the resistor disk and shared by four adjacent disk resistors. For each resistor, a annular-shaped disk of resistive material is fabricated on a first surface of the substrate, such that a central opening in the disk overlies at least the upper surface of a first contact via. The disk geometry and material determines its resistance. Next, a layer of conductive material is formed over the first surface of the substrate to cover at least the periphery of each disk, and to fill the central opening in each disk. This conductive material electrically couples at least the periphery of each resistive disk with each second contact via to define $V_T$ nodes, and also separately electrically couples the disk center to the underlying first contact via. Solder balls at the lower surface of each via provide an array of first and second contacts for each resistor for attaching the substrate to a printed wiring board or other substrate. An array may include hundreds of termination resistors having substantially real impedances in the range of 50 Ω to 100 Ω at frequencies up to about 12 GHz.

20 Claims, 6 Drawing Sheets

LOW INDUCTANCE TERMINATION RESISTOR ARRAYS

FIELD OF THE INVENTION

The invention relates to resistor arrays that provide a plurality of termination impedances for high-speed circuits including digital circuits, and more specifically to low inductance termination resistor arrays for use with high frequency circuits.

BACKGROUND OF THE INVENTION

It is known in the art to provide a termination impedance of perhaps 50 Ω to 100 Ω at the far end of a transmission line driven by output node of an electronic circuit, including an integrated circuit ("IC"). For example, if signals are coupled from an IC output using coaxial cable, a 50 Ω or 75 Ω termination impedance matched to the cable is desired, while signals provided to small computer system interface bus ("SCSI") are commonly terminated with 100 Ω impedance. Unless suitably terminated, the IC output node signal may exhibit ground bounce, overshoot and undershoot, and exhibit back reflections, especially at higher switching frequencies, e.g., 100 MHz or higher.

By way of example, FIG. 1 depicts a substrate 10 such as a printed wiring board that includes integrated circuits 20A, 20B, 30A, 30B, 40 and 50, whose various output or input nodes may require termination with a suitable terminating resistor R. Circuits 20A, 20B, for example, may be drivers whose properly terminated output signals may be coupled to other on-substrate circuits 30A, 30B such as receivers, or perhaps to circuits such as integrated circuit 60 on a second substrate 70. Other circuits, e.g., 40 and 50, may also require input/output pin termination. Circuit 50, for example, might be an analog video buffer.

In FIG. 1, output signals from driver 20B on IC 10 are depicted as coupled via lines 50, e.g., printed circuit board or printed wiring board traces, or wires, or perhaps coaxial cables, to IC 60 whose input pins are properly terminated with resistors R. (While FIG. 1 depicts circuit 20B with dual output pins, for digital circuits a single output pin is more commonly used.)

In FIG. 1, the signals coupled over lines 50 may represent a multi-bit high speed bus. In practice, such a bus may carry not merely four signals as shown in FIG. 1, but hundreds of signals, each of which requires proper termination. Further, although IC 10 is depicted with twenty-four input or output pins, here depicted as 100-1, 100-2, ... 100-24, in practice there may be hundreds of such pins.

As shown in FIG. 1, it is known in the art to provide an array of termination resistors R in one or more IC packages, e.g., 150A, 150B, 150C. The use of such termination resistor arrays advantageously reduces the number of components that must be placed on a printed circuit board, a printed wiring board, or on a substrate containing, for example, IC 10, IC 60 and arrays 150A, 150B, 150C. Although FIG. 1 depicts only thirty termination resistors R (not all of which are used), in practice hundreds of such resistors may be required IC 150A is a so-called dual-inline-package ("DIP"), in which each termination resistor in the array has a first end (or contact) coupled to an input/output pin on the array package, and has a second end (or contact) coupled to a common $V_T$ termination voltage node. IC 150B and IC 150C are so-called single-inline packages ("SIP"), and also contain an array of termination resistors that each have one end coupled to a $V_T$ node. In use, the $V_T$ node will be coupled to a source of $V_T$ termination voltage. The magnitude of this voltage may be ground, −2 VDC when terminating emitter-coupled logic ("ECL"), +1.25 when terminating Gunning transceiver logic ("GTL"), or some other potential magnitude.

In practice, digital ICs 20, 30 may operate at switching speeds in excess of 100 MHz. Thus, it is important that terminating impedances R present a pure resistive impedance with relatively small parasitic inductance and/or capacitance components. Such parasitic, or imaginary, impedance components can result in overshoot and undershoot on rapidly changing signals, and can result in a load impedance that can undesirably reflect at least part of the signal back into the outputting IC, reducing system noise margin. In general, cables, backplanes, printed wiring board traces, and traces internal to an IC are treated as though they were transmission line segments when their line electrical length exceeds 50% of the risetime of the signals being carried.

FIG. 2A is a prior art SIP array, such as array 150B shown in FIG. 1. The distal first ends of each resistor are coupled to IC 150B input/output pins, e.g., 160-2, 160-3 ... 160-9. One pin, 160-1, is used to couple the $V_T$ potential to the common second ends of the resistors R in array 150B. For ease of illustration, FIG. 1 shows input/output pins on ICs 150A, 150B, 15C spaced-apart or unconnected to input/output pins on ICs 10 and 60. In practice, corresponding pins are coupled together, e.g., pin 160-1 on IC 150B is coupled to a source of potential $V_T$, pin 160-2 is coupled to pin 100-12, and so forth. Such couplings are typically made using conductive traces on a substrate or printed wiring board or printed circuit board containing the various ICs and arrays.

As depicted in FIG. 2B, prior art SIP array 150B is characterized by inductances $L_1$ in series with the distal end of each resistor R, and by inductance $L_2$ coupled in series between adjacent resistors. (The DIP array 150A shown in FIG. 1 may also be presented as including inductances $L_1$ and $L_2$.)

Inductance is a measure of the energy contained in the magnetic field caused by current flow through a conductor. Unfortunately, SIP termination arrays such as 150B have an effective half-turn inductive loop formed of conductive material in the current path. Absent magnetic materials (such as iron), inductance would be primarily a property of the geometry of the current flow. Thus, with respect to SIP array 150B as shown in FIG. 1 and FIG. 2A, if the inductive loop were reduced in size or preferably eliminated, inductances $L_1$ and $L_2$ could be reduced or substantially eliminated.

Those skilled in the art of high speed circuit design will appreciate that the equivalent inductance ($L_{eq}$) associated with any given R can degrade rapidly changing current transitions (di/dt) appearing across the resistor. Ideally such inductances should have zero value.

Typically, voltage spiking related to $L_{eq}$di/dt may occur, where $L_{eq}$ is the equivalent inductance, and di/dt represents current change as a function of time. One component of such voltage spiking is sometimes referred to as ground bounce.

Further, the complex (e.g., not purely resistive or real) impedance presented can result in a substantial impedance mismatch between a transmission line and its load. This impedance mismatch can cause a portion of the signal being output to reflect back into the line, with resultant degradation of signal quality and digital noise margins. Such degradation becomes more troublesome at higher frequencies because a given amount of parasitic impedance contributes a greater amount of phase shift and impedance mismatching.

In addition to providing termination resistors having low parasitic impedance components, a termination array should also provide adequate heat dissipation. Unfortunately, prior art termination resistor arrays such as array 150 do not necessarily provide good thermal transfer characteristics.

There is a need for an array of termination resistors having reduced magnitude reactive components. Preferably such an array should be implemented using existing fabrication techniques, and should provide substantially real termination impedance for signals having rise and/or fall times of 200 ps or less. Finally, such an array should have adequate heat dissipation characteristics.

The present invention provides such a termination resistor array and a method for fabricating the array.

SUMMARY OF THE PRESENT INVENTION

The present invention recognizes that if a termination impedance can be implemented with a geometry that results in substantially zero net magnetic field, the effective series inductance of the impedance will be minimal.

This geometry is realized by fabricating an array of disk termination resistors using thick-film or thin-film materials, on a substrate. Each resistor has one first contact at the center of the resistor disk. Each resistor also has a number M that is at least two and preferably at least four second contacts, located symmetrically on a circle centered about the resistor disk. Each of the second contacts is preferably shared by four adjacent disk resistors and collectively the second contacts define the $V_T$ node for the array.

Conductive through vias are formed in the substrate, spaced-apart in an array pattern defining what will be first and second contacts for each resistor. Annulus-shaped disk patterns of resistive material are then fabricated on a first surface of the substrate, one resistive disk being fabricated for each resistor. The central opening in each resistive disk coaxially overlies the upper surface of a chosen via that will be used for that resistor's first contact. The central disk opening has a diameter somewhat greater than the diameter of the underlying first contact via. The disks are sized and fabricated from a material having resistivity that will provide a desired termination impedance, e.g. 50 Ω.

Next, a layer of conductive material is deposited over all of the upper surface of the substrate except for an annulus portion of each resistive disk. The conductive layer material surrounds and peripherally contacts each resistive disk and also fills the central via-overlying opening in each disk. The conductive material at the center of each disk makes electrical contact between the disk center and the underlying first contact via. The conductive material on the remainder of the upper substrate surface couples together all of the second contact vias for all of the resistors, and collectively defines the $V_T$ nodes. The thickness of the conductive layer preferably approximates the thickness of the resistive disks. The impedance of each resistor is thus defined between the resistor's first contact and the second contacts, or common $V_T$ connection.

Solder balls may be added to the lower surface of each first and second contact via to provide an array of first and second contacts for each resistor. The array may then be soldered to a printed wiring board or the like, or to an integrated circuit. A heat sink may be thermally coupled to the top surface of the array. The resultant terminating resistor array provides substantially real termination impedances at frequencies up to about 12 GHz.

Other features and advantages of the invention will appear from the following description in which a preferred embodiment has been set forth in detail in conjunction with the accompanying drawings.

DETAILED DESCRIPTION OF THE PREFERRED EMBODIMENTS

Figure 1:
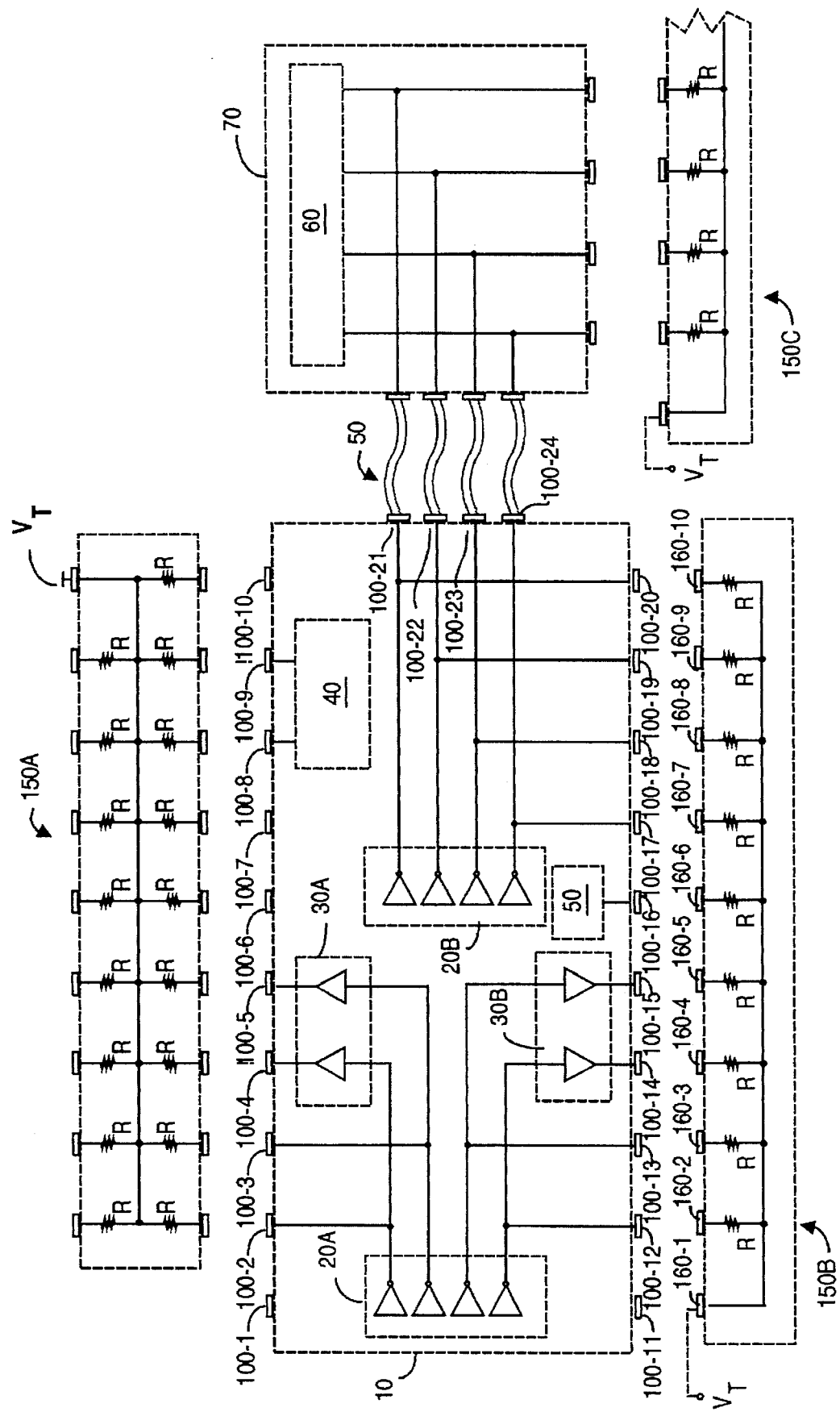
FIG. 1 depicts a substrate-mounted integrated circuits with off-substrate SIP and DIP arrays of termination resistors, according to the prior art.
Figure 2A:
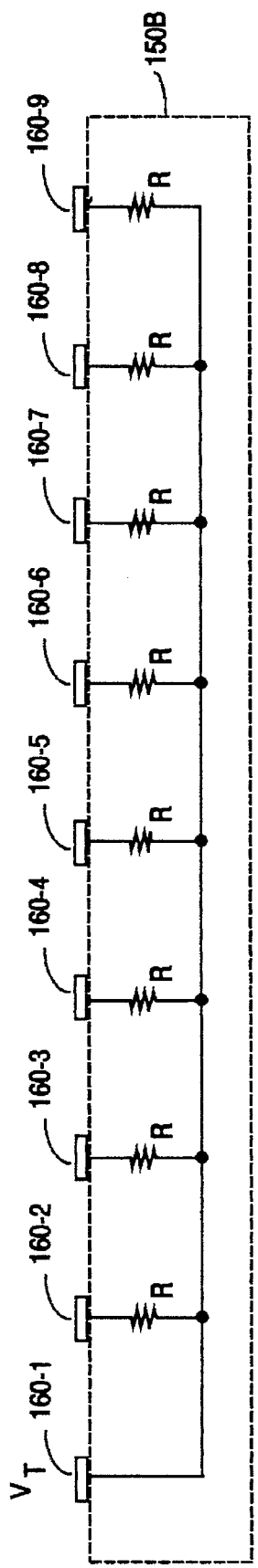
FIG. 2A is an array of termination resistors mounted in a single-inline-package ("SIP"), according to the prior art.
Figure 2B:
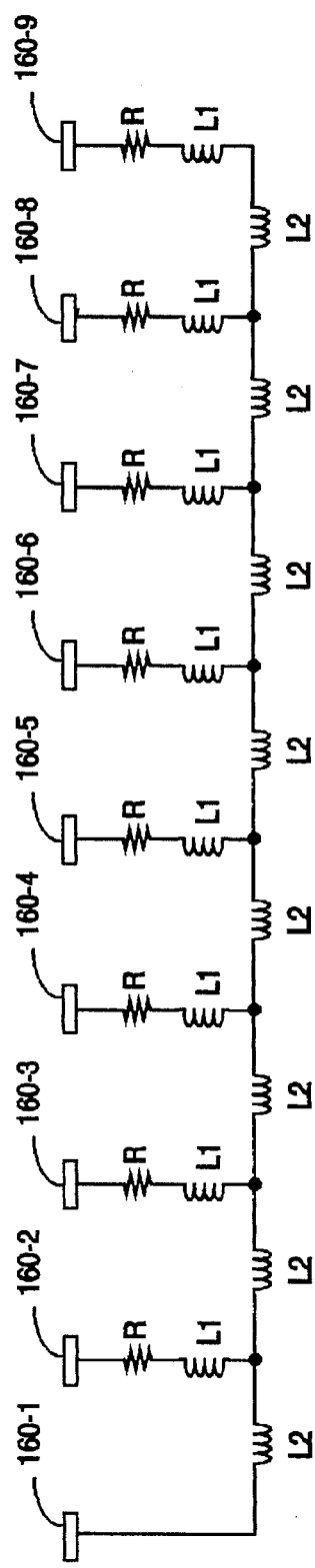
FIG. 2B depicts the equivalent complex impedance presented by the prior art SIP array of termination resistors depicted in FIG. 2A.
Figure 3:
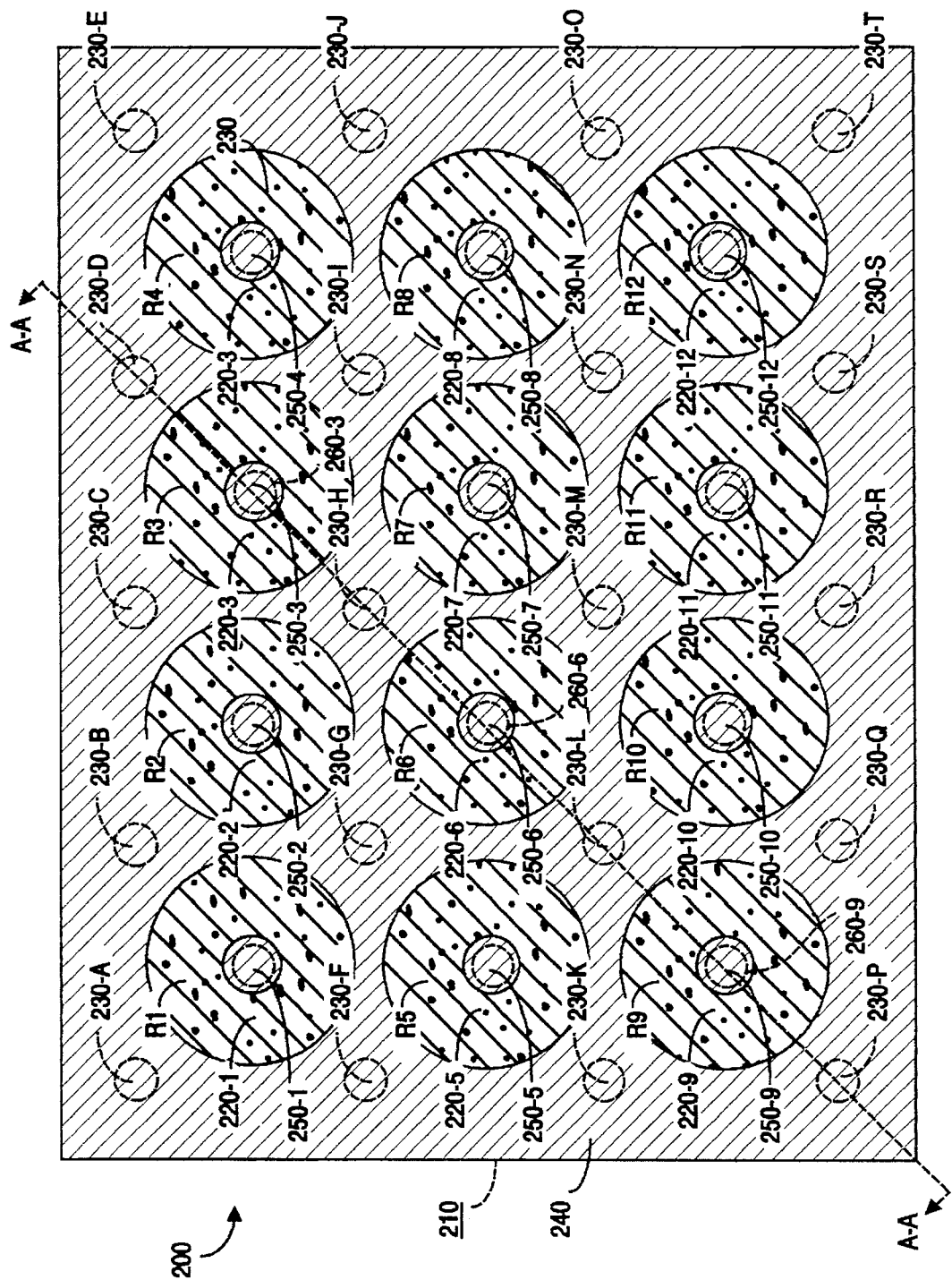
FIG. 3 is a plan view of an array of disk termination resistors, according to the present invention.

FIG. 3 is a plan view of an array 200 of disk resistors $R_N$, e.g., R1, R2, . . . R12, formed on a preferably ceramic substrate 210, although other substrate materials could of course be used. Each resistor $R_N$ has a resistance substantially determined by a donut-shaped disk of resistive material 220-N formed on the upper surface of substrate 210. Although FIG. 1 depicts only twelve resistors, in practice array 200 may include hundreds of resistors.

Figure 4A:
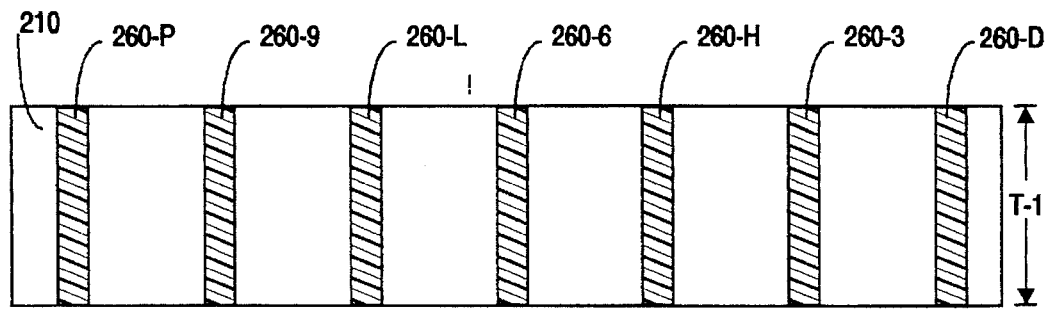
FIG. 4A is a sectioned view depicting formation of conductive vias in a substrate during fabrication of an array of disk termination resistors, according to the present invention.
Figure 4B:
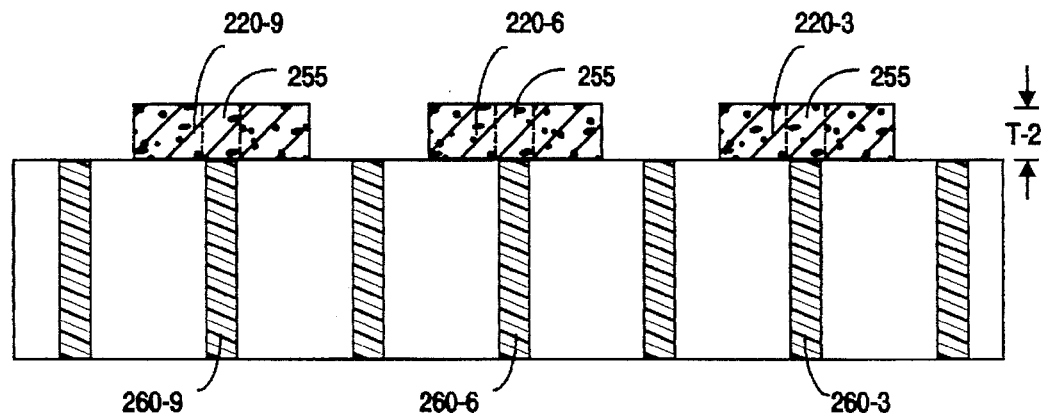
FIG. 4B depicts the substrate of FIG. 4A after formation of donut-shaped resistive disks, according to the present invention.
Figure 4C:
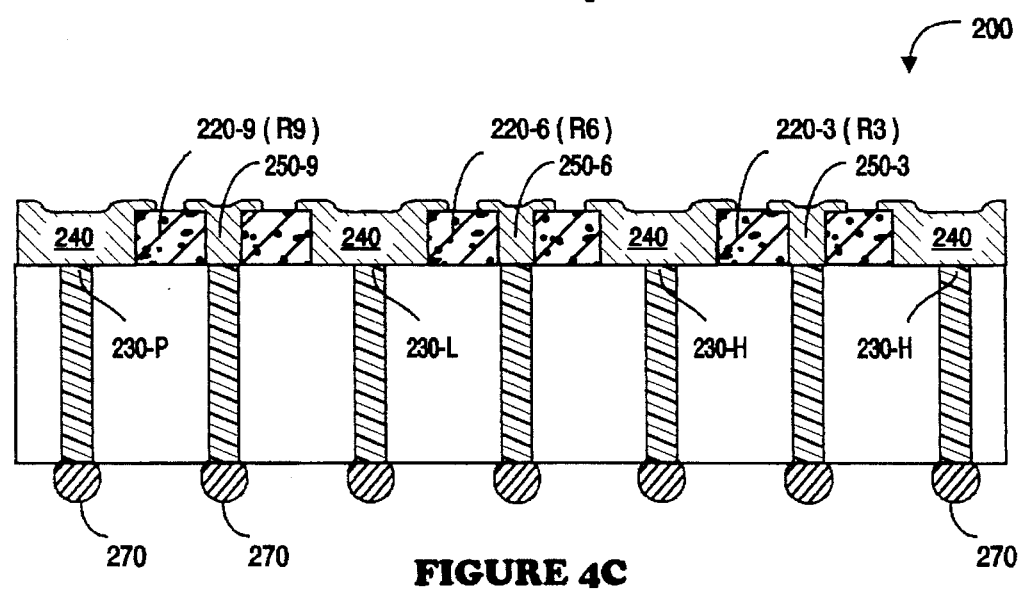
FIG. 4C depicts the substrate of FIG. 4B after formation of a conductive layer and attachment of solder balls, to form an array of disk termination resistors, according to the present invention.

As will may be seen from FIG. 4B and FIG. 4C, an opening 255 at the center of each disk 220-N is filled with conductive material 240 to form regions 250-N that establish the first contact 250-N for the associated resistor $R_N$. The second contact 230 for a given resistor $R_N$ is any of the adjacent termination voltage contacts 230-A, 230-B, etc. shown in FIG. 3. Thus, disk 220-6 is used to form resistor R6, whose first contact is a circular region 250-6 of conductive material 240 that is formed in the disk center the exposed upper surface of the associated first contact via 260-6. The second contact for resistor R6 is any of adjacent contacts 230-G, 230-H, 230-L, 230-M. (As will be seen from FIG. 4C, these contacts are the upper surface of conductive vias.)

As shown in FIG. 3, conductive layer 240 preferably couples together each of the second contacts, which define $V_T$ nodes, and also forms the first contact circular region at the center of each disk. As noted, when the array is used to terminate circuitry, the $V_T$ node is often coupled to ground or to a non-zero reference voltage. If required, one or more regions of plane 240 may be electrically isolated from other regions by forming a groove-like channel surrounding some of the resistors and some of the second contacts. Resistors within the island regions thus formed could have their second contacts coupled to a different node $V_T'$, and thus to a voltage potential other than what is coupled to the $V_T$ node.

For an array such as shown in FIG. 3, in which the number of resistors N is X resistors/row x Y resistors/column, the number of $V_T$ contacts is [X·Y]+[X+Y]+1. For the example of FIG. 3, X=4, Y=3, and the number of $V_T$ contacts is [4·3]+[4+3]+1=20, as shown.

As shown by FIG. 3, preferably an even number, preferably a minimum of four, of second contacts 230 is provided for each resistor $R_N$, a second contact typically being shared by four adjacent resistors. The contacts are located symmetrically about each resistor disk and are equidistant from the disk center. If adjacent disks are spaced apart a distance Z, the distance from disk center to center of surrounding second contacts is 0.52 if measured horizontally or vertically, or a distance $z/\sqrt{2}$ if measured radially outward from disk center.

The four-way symmetry provided by the configuration of FIG. 3 advantageously provides for substantial cancellation of left and right-travelling current components, and upward and downward-travelling current components, for switched current. A useful greater number of contacts would be eight second contacts per resistor, in which the four additional contacts are at 45° relative to the original four contacts. Although greater than four second contacts per resistor would provide a more ideal disk resistor, having to provide additional vias and solder balls (or other) contacts would complicate fabrication of the array.

Fabrication steps involved in producing array 200 are shown in FIGS. 4A–4C, which represent a sectional view of the array of FIG. 3, taken along the section line A—A.

As shown in FIG. 4A, initially, a plurality of through columns are formed in a substrate 210 having a thickness T-1 that typically ranges from perhaps 500 μm to 650 μm, although other dimensions could be used. The columns are then filled with a conductive material to form conductive vias whose diameter typically ranges from perhaps 10 μm to perhaps 250 μm. Via formation is known in the art and may be accomplished using various methods including co-firing and post-firing drilling and filling.

The conductive vias 260, here 260-P, 260-9, 260-L, 260-6, 260-H, 260-3, 260-D are formed in the substrate in arrayed locations at which first and second resistor contacts are to be made. As best seen in FIG. 3, in a plan view these vias (and their associated contacts) preferably form a regular grid-like array. Spacing between adjacent via contacts will typically be 0.1" (2.54 mm), or 0.707" (1.78 mm) for interstitial spacing, although other dimensions may instead be used. The grid-like array defined by the vias and their contacts will in any event have a spacing suitable to the application and package at hand.

As shown in FIG. 4B, annular-shaped resistive disks 220-N are next formed by deposition coaxially atop respective first contact conductive vias, each disk defining a central opening 255 whose diameter is perhaps 5% greater than the diameter of the underlying first contact via. As will be seen from FIG. 4C, disk openings 255 facilitate electrical coupling between each disk and its associated underlying first contact via. Thus in FIG. 4B, disk 220-9 overlies first contact via 260-9 and will ultimately form resistor R9, disk 220-6 overlies first contact via 260-6 and will ultimately form resistor R6, and disk 220-3 overlies first contact via 260-3 and will form resistor R3, etc.

The formation of resistive disks such as 220-N is known in the art, as is the modification of thick film constituent materials, or of thin film materials to arrive at a desired resistivity. Thick film materials, for example Cermet, may be formed using screen deposition, e.g., using a screening pattern and printing with resistively-conductive ink. The film thickness T-2 typically will be in the 20 μm to 125 μm range for thick film materials. Thick film fabrication techniques have a larger tolerance of perhaps 20 μm to 50 μm.

By contrast, for thin films, e.g., tantalum nitride or nichrome, thickness T-2 will be in the 1 μm to 50 μm range, although other dimensions may be used. Thin film materials may be applied using semiconductor fabrication techniques, such as photolithography and deposition. Greater fabrication precision is available using thin film techniques as fabrication tolerances as small as about 2–5 μm are available.

The resistive material, area, and thickness of the annular-shaped disks 220-N will be determined by several factors including the desired termination impedance, the number of resistors to be formed in the array, and the heat to be dissipated by the overall array. For example, if emitter-coupled logic ("ECL") buffers are being terminated, a 1"×1" (25.4 mm×25.4 mm) substrate containing an array of one hundred terminating resistors $R_N$ might dissipate 2 watts. Dissipation depends upon many variables including resistance, logic signal swings, and termination voltage. For example, termination of complementary metal-oxide-semiconductor ("CMOS") or Gunning transceiver logic ("GTL") signals may call for more or less dissipation than in the above example.

The resistance of a disk resistor $R_N$ is a function of the effective circular area of disk 220-N, as well as the resistivity of the material from which the disk was formed. Thick and thin film materials are available with resistivities varying from perhaps 1 Ω/square to 1,000 Ω/square. However, resistivities in the range 10 Ω/square to 100 Ω/square are preferred as they produce better aspect ratios.

The density of current flow through a resistive disk decreases with radial distance from the disk center, and thus resistance is determined solely by the ratio of inner to outer radii and resistivity. The formula for effective resistance R of a disk resistor $R_N$ is:

$$R = \frac{\rho_s}{2\pi} \cdot \ln\left(\frac{r_2}{r_1}\right)$$

where R is resistance, $\rho_s$ is material 220-N film resistivity in Ω/square, $r_1$ is the radius of the inner contact 250-N, and $r_2$ is the radius of the outer contact 220-N.

By way of example, assume that an array according to the present invention is fabricated with thin film technology, and that the array spacing is 0.050" or 1270 μm, center-to-center for connecting solder balls (see FIG. 4C). Table 1 depicts various values of $r_2$, $r_1$ and $\rho_s$ for a 50 Ω termination impedance.

TABLE 1

| R | $r_2$ | $r_1$ | $\rho_s$ |
| --- | --- | --- | --- |
| 50 Ω | 0.040" | 0.010" | 227 Ω/□ |
| 50 Ω | 0.080" | 0.015" | 188 Ω/□ |
| 50 Ω | 0.030" | 0.070" | 371 Ω/□ |
| 50 Ω | 0.080" | 0.010" | 151 Ω/□ |

Turning now to FIG. 4C, a layer having thickness T-2 of conductive material 240 is now fabricated on the uppermost surface of array 200, preferably using a mask. The mask causes deposition of material 240 to surround and at least slightly overlap the periphery of the resistive disks formed in FIG. 5B. The deposition also fills openings 255 to form a conductive region 250-N in the center of each disk to electrically connect the resistive disk center to the upper surface 230 of the underlying first contact via 260-N. For example, region 250-9, formed from conductive material in layer 240, ensures electrical contact between the center of disk 220-6 (which forms resistor R6), and its underlying first contact via 260-6.

Note that the conductive layer 240 material forms electrical contact with the upper surfaces 230P, 230-L, etc. of vias 260P, 260-L, etc., which are used as resistor second contacts, defining the $V_T$ node.

If thick film resistive disks were formed, layer 240 may be formed by electroplating, or by conventional masking and use of conductive ink screening. If thin film resistive disks were formed, layer 240 may be formed using semiconductor fabrication processes, such as masking and deposition.

In applications where the tolerance of the termination resistors R is critical, holes or slots may be formed as needed in the disks to increase the resistance. The use of lasers to precision trim resistive materials to achieve a desired overall resistance is known in the art. In the present application, such trimming would preferably be carried out symmetrically.

Figure 5:
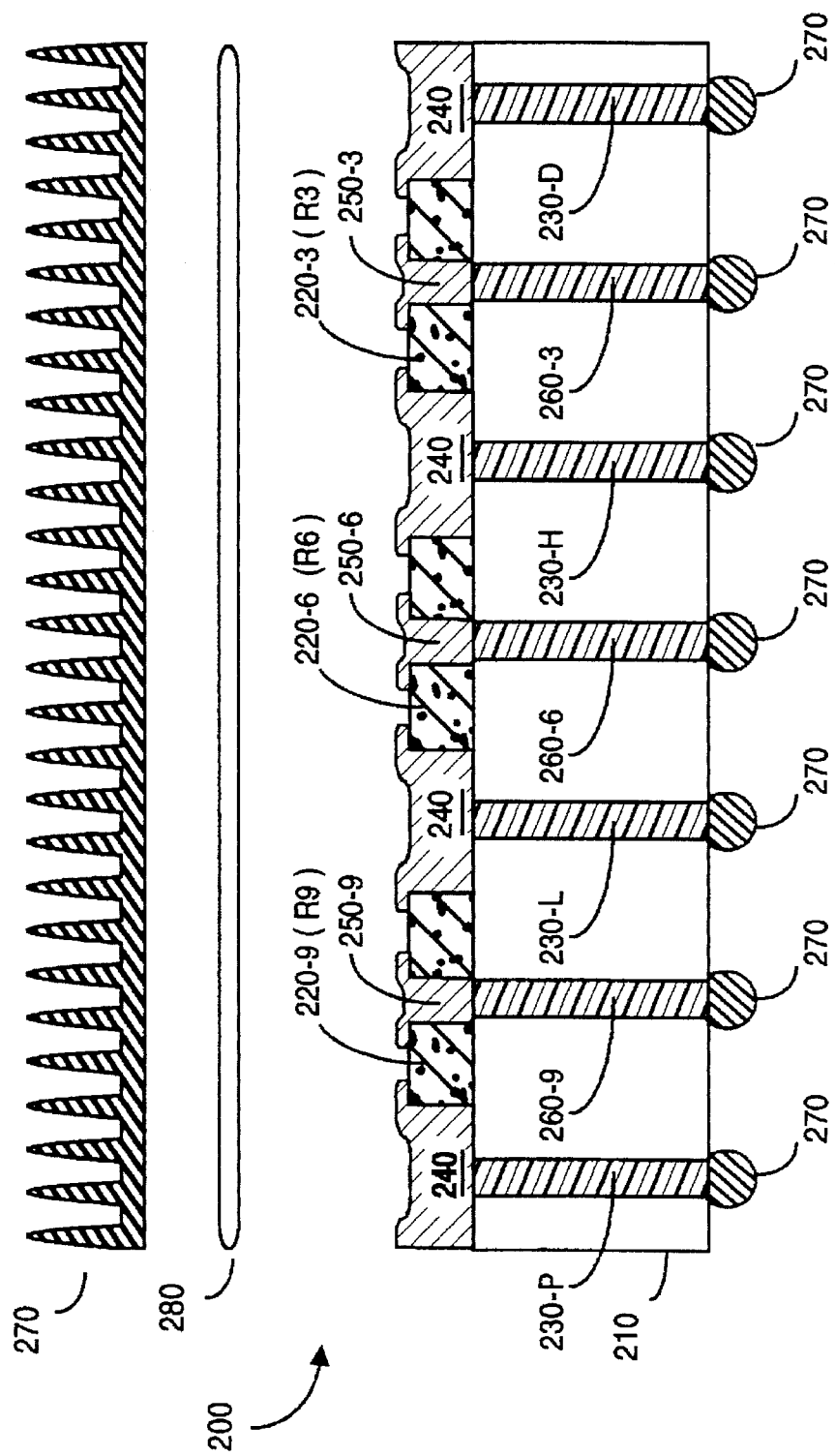
FIG. 5 depicts use of a heat sink with the array of FIG. 4C, according to the present invention.

As depicted in the lower portion of FIG. 4C, solder balls 270 may be attached to the various first and second contact conductive vias. The solder balls form a pattern and allow array 200 to be soldered to an array of contacts on a printed circuit board, integrated circuit, or other substrate. The diameter of the solder balls is typically in the range of about 500 μm to 900 μm. In some applications, it may be desirable to make electrical connection to at least some first and second contacts at the upper surface of array 200, rather than at the lower surface as shown in FIG. 5. Upper surface contact may also be achieved, for example by attaching solder balls to some or all first contacts 250-N and/or to some or all second contacts at regularly-spaced surface regions of layer 240.

As shown in FIG. 5, one advantage of locating solder balls 270 on the lower array surface is that a heat sink 270 may be attached with an adhesive 280 to the upper array surface. Adhesive 280 would of course have good thermal conducting characteristics but be an electrical insulator, such as epoxy adhesives sold commercially by companies such as Emerson and Cummings, and Wakefield, among others. For ease of illustration, FIG. 5 depicts heat sink 270 and adhesive 280 spaced-apart from the upper surface of array 200, rather than in intimate thermal contact as would be the case in practice. An array of disk termination resistors, such as shown in FIG. 5, can dissipate heat more efficiently than prior art SIP or DIP arrays. Further, arrays according to the present invention present a more purely resistive terminating impedance, with less degradation to signals and IC signal performance and reliability than prior art SIP or DIP arrays.

Figure 6:
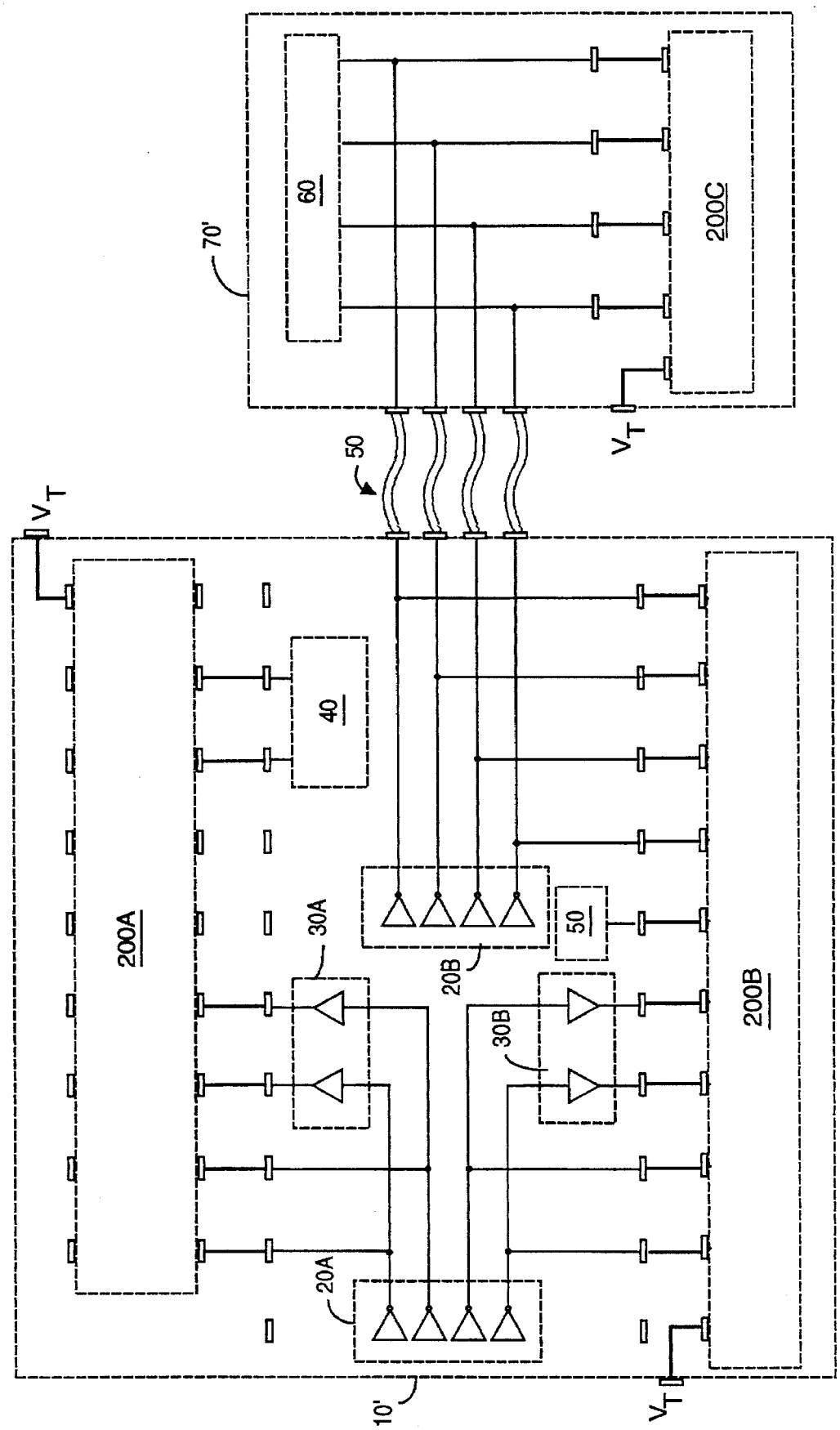
FIG. 6 depicts a substrate with integrated circuits including on-substrate arrays of termination resistors, according to the present invention.

FIG. 6 depicts a substrate 10', somewhat similar to what was shown in FIG. 1. However, in contrast to FIG. 1, substrate 10', which may be a printed wiring board, includes on-substrate termination resistor arrays 200A, 200B, according to the present invention. While two such arrays are shown, more or fewer arrays may be provided, depending upon the total number of termination resistors required. Further, arrays 200A and 200B may be fabricated as a single on-substrate array of disk termination resistors. Similarly, a second substrate 70' includes an integrated circuit 60 and an on-substrate termination resistor array 200C, according to the present invention.

In FIG. 6, connections between pins on the resistor arrays and nodes coupled to the ICs on the substrates are drawn with heavy lines to depict conductive traces carried by substrate 10' or 70'. "Pins" are shown in FIG. 6 corresponding to what were input/output pins for substrate 10 in FIG. 1 to more readily permit identification of the circuitry being terminated, relative to FIG. 1.

In some packaging configurations, substrate 10', for example, may have pin-outs or nodes requiring termination fabricated on the upper and/or lower surface of the substrate. Termination arrays according to the present invention may advantageously be soldered (or otherwise attached) to such pin-outs or nodes by mounting the array above or below the plane of the substrate. Such mounting permits termination contacts to be made directly to nodes or pins on the substrate requiring termination without using traces such as shown in FIG. 6. Vertical mounting of such arrays is possible because of their inherently low parasitic impedance. By contrast, attempting to mount a prior art SIP or DIP termination array above or below the plane of the substrate requiring termination would aggravate the already high parasitic impedance that characterizes such arrays.

In FIG. 6, because termination resistor arrays 200A, 200B, 200C are implemented as disk resistors, e.g., with a geometry resulting in substantially zero net magnetic field, the impedances are effectively real, with smaller reactive components than conventional SIP or DIP arrays. Further, because arrays according to the present invention may be implemented on-substrate with the circuitry requiring termination, overall packaging can be simplified, and lead lengths (and associated parasitic components) are further minimized. Finally, more effective heat sinking can be provided by a termination resistor array according to the present invention.

Modifications and variations may be made to the disclosed embodiments without departing from the subject and spirit of the invention as defined by the following claims.

What is claimed is:

1. A method of forming planar array of value-trimmable termination resistors having reduced parasitic impedance, the method comprising:

providing an array of disk-shaped termination resistors, each of said resistors being formed as an annular-shaped disk of resistive material with a first contact located at a center portion of said disk, and with M>1 second contacts disposed symmetrically on a circle centered about said first contact such that adjacent ones of said M second contacts are spaced-apart angularly (360/M) degrees, wherein one of said second contacts can be a second contact for more than one of said resistors;

wherein electrical contact to a resistor in said array is made between said resistor's first contact and said resistor's M second contacts.

2. The method of claim 1, wherein for at least one terminating resistor in said array, each of said M second contacts are electrically coupled together and to at least an outer periphery of said resistor's disk;

wherein when a resistor in said array is used to terminate a signal, said signal is coupled between said resistor's first contact and said resistor's M second contacts; and wherein resultant current flow produces substantially symmetrical and substantially cancelling magnetic fields such that effective inductance is reduced.

3. The method of claim 1, wherein each disk has an outer radius $r_2$ and a said center portion with radius $r_1$; and wherein each of said termination resistors has an effective resistance R given by:

$$R = \frac{\rho_s}{2\pi} \cdot \ln\left(\frac{r_2}{r_1}\right)$$

where $\rho_s$ is resistivity in Ω/square of said resistive material.

4. The method of claim 1, wherein said array includes N resistors arranged in evenly spaced-apart rows containing X resistors, and in evenly spaced-apart columns containing Y resistors;

wherein N=(X·Y), M=4, and total number of said second contacts is equal to (X·Y)+(X+Y)+1.

5. The method of claim 1, wherein each said disk has an outer diameter D, and adjacent disks are spaced-apart from each other a distance exceeding D.

6. A method for forming a planar array of N termination resistors each having a first contact and at least M second contacts where M>N wherein one of said second contacts can be a second contact for more than one of said resistors, the method comprising the following steps:

(a) forming in a substrate having a spaced-apart first surface and a second surface, spaced-apart N first contact vias, and forming for each of said resistors at least M second contact vias each disposed on a circle centered on a first contact via such that adjacent ones of said second contact vias are spaced-apart angularly (360/M) degrees;

(b) forming at said first surface of said substrate coaxially with an underlying one of said first contact vias, an annular-shaped resistive disk having an outer radius $r_2$ sized such that adjacent disks do not contact each other, and defining a centrally located opening of radius $r_1$; and (c) forming over said first surface of said substrate a layer of conductive material overcovering and electrically coupling together at least a peripheral region of each said disk and each said upper surface of each said second contact, said layer also at least partially filling each said centrally located opening to electrically couple at least a central portion of each overlying said disk with an underlying said first contact via;

wherein N disk resistors are formed, each having a centrally located first contact and at least M second contacts.

7. The method of claim 6, wherein at step (b) said first and second contact vias define an array pattern when viewed from said first or second surface of said substrate.

8. The method of claim 6, wherein for each said resistor there are M=4 said second contacts.

9. The method of claim 6, wherein at step (b) said N first contact vias are arranged in evenly spaced-apart rows containing Y first contact vias, and in evenly spaced-apart columns containing Y first contact vias;

wherein N=(X·Y), M=4, and total number of said second contacts is (X·Y)+(X+Y)+1.

10. The method of claim 6, wherein each of said N resistors has an effective resistance R given by $$R = \frac{\rho_s}{2\pi} \cdot \ln\left(\frac{r_2}{r_1}\right)$$

where R is resistance, and $\rho_s$ is resistivity in Ω/square of material used at step (b) to form said disks.

11. The method of claim 6, wherein at step (b), $r_1$ is as least as large as a radius of a said underlying first contact via.

12. The method of claim 6, wherein at step (b) said disks have a thickness T-2, and wherein at step (c) said layer of conducting material has a thickness substantially equal to said T-2.

13. The method of claim 12, wherein said thickness T-2 ranges from about 20 μm to about 125 μm.

14. The method of claim 12, wherein said thickness T-2 ranges from about 1 μm to about 50 μm.

15. The method of claim 6, including a subsequent step (d) of attaching a solder ball to a chosen outer surface of each said via.

16. A planar of N termination resistors each resistor having a first contact and at least M second contacts where M>N and where one of said second contacts can be a second contact for more than one said resistors, the array comprising:

a substrate having spaced-apart first and second surfaces;

spaced-apart N first contact vias formed in said substrate;

for each one of said resistors, at least M second contact vias formed in said substrate and disposed on a circle centered about one of said first contact vias such that adjacent ones of said second contact vias are spaced-apart angularly (360/M) degrees;

N annular-shaped resistive disks each having an outer radius $r_2$ sized such that adjacent disks do not contact each other and formed at said first surface of said substrate coaxially with a center of one of said N first contact vias, each of said disks defining a centrally located opening of radius $r_1$;

a layer of conductive material electrically coupling together at least a peripheral region of each said disk and each said upper surface of each said second contact, said layer also at least partially filling each said centrally located opening to electrically couple at least a central portion of each overlying said disk with an underlying said first contact via;

wherein N disk resistors are formed, each having a centrally located first contact and at least M second contacts.

17. The array of claim 16, wherein for each said resistor there are M=4 said second contacts.

18. The array of claim 16, wherein said N first contact vias are arranged in evenly spaced-apart rows containing X first contact vias, and in evenly spaced-apart columns containing Y first contact vias;

wherein N=(X·Y), M=4, and total number of said second contact vias is (X·Y)+(X+Y)+1.

19. The array of claim 16, wherein each of said N resistors has an effective resistance R given by $$R = \frac{\rho_s}{2\pi} \cdot \ln\left(\frac{r_2}{r_1}\right)$$

where R is resistance, and $\rho_s$ is resistivity in Ω/square of material used to form said disks.

20. The array of claim 16, wherein said disks and said layer of conducting material each have a common thickness substantially T-2; and wherein said array is formed from the group consisting of (i) thin film materials having a thickness T-2 ranging from about 1 μm to about 50 μm, and (ii) thick film materials having a T-2 ranging from about 20 μm to about 125 μm.

* * * * *

UNITED STATES PATENT AND TRADEMARK OFFICE
CERTIFICATE OF CORRECTION

PATENT NO. : 5,661,450

DATED : August 26, 1997

INVENTOR(S) : DAVIDSON

It is certified that error appears in the above-indentified patent and that said Letters Patent is hereby corrected as shown below:

Column 5, line 18, delete "0.52" and insert therefor --0.5Z--.

Claim 9, column 9, line 53, delete "Y first contact" and insert therefor --X first contact--.

Claim 16, column 10, line 15, delete "one said" and insert therefor --one of said--.

Signed and Sealed this

Eighteenth Day of November 1997

Attest:

BRUCE LEHMAN

*Attesting Officer*　　　*Commissioner of Patents and Trademarks*